Figure 1:
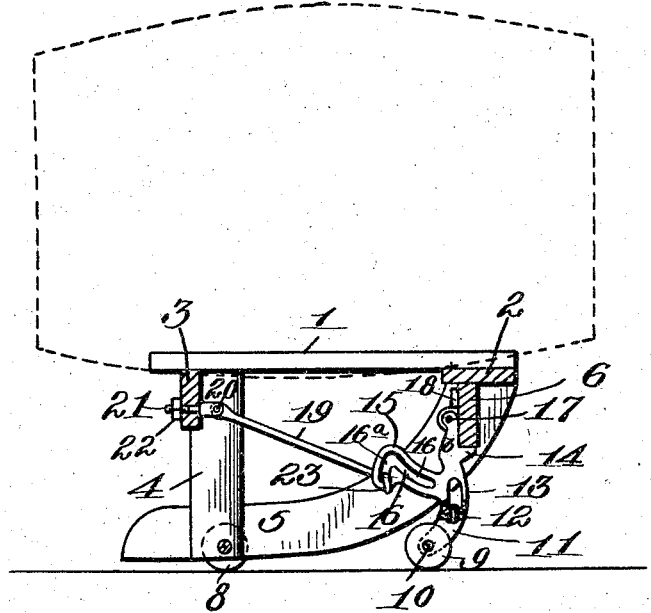

No. 784,992. PATENTED MAR. 14, 1905.
H. K. & J. J. DIMMICK.
COMBINED WHEEL TRUCK AND SUPPORT.
APPLICATION FILED JUNE 29, 1904.

Witnesses:
C. D. Kesler
James L. Norris, Jr.

Inventors
Homer K. Dimmick
Jaman J. Dimmick
By James L. Norris
Atty.

No. 784,992. Patented March 14, 1905.

UNITED STATES PATENT OFFICE.

HOMER K. DIMMICK AND JAMAN J. DIMMICK, OF APPLETON, WISCONSIN.

COMBINED WHEEL TRUCK AND SUPPORT.

SPECIFICATION forming part of Letters Patent No. 784,992, dated March 14, 1905.

Application filed June 29, 1904. Serial No. 214,673.

*To all whom it may concern:*

Be it known that we, HOMER K. DIMMICK and JAMAN J. DIMMICK, citizens of the United States, residing at Appleton, in the county of Outagamie and State of Wisconsin, have invented new and useful Improvements in a Combined Wheel Truck and Support, of which the following is a specification.

This invention relates to wheel trucks or supports.

The object of the invention is to provide an improved wheel truck or support for lifting, supporting, and conveying barrels, boxes, and the like.

The invention further aims to provide a wheel truck or support which may be termed a "tilting barrel-stand and truck" and which is so mounted upon wheels that it can be loaded and moved without requiring the operator to support or uphold the load and which is, furthermore, so constructed as to tilt and act as a lever to lift the load.

The invention further aims to provide a wheeled truck or support with its front wheel automatically movable into and out of position and further provide the truck or support with means for locking the front wheel in position.

The invention further aims to construct a wheeled truck or support which may be termed a "tilting barrel-stand and truck" and which shall be simple in its construction, strong, durable, efficient in its use, and comparatively inexpensive to manufacture.

With the foregoing and other objects in view the invention consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like reference characters denote corresponding parts throughout the several views, in which—

Figure 2:
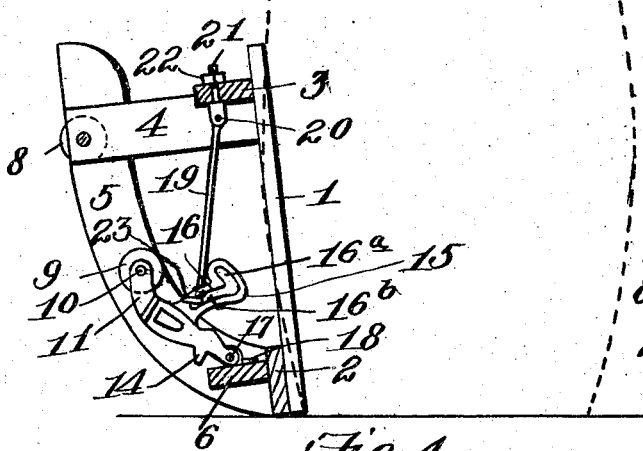
Figure 4:
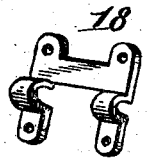
Figure 3:
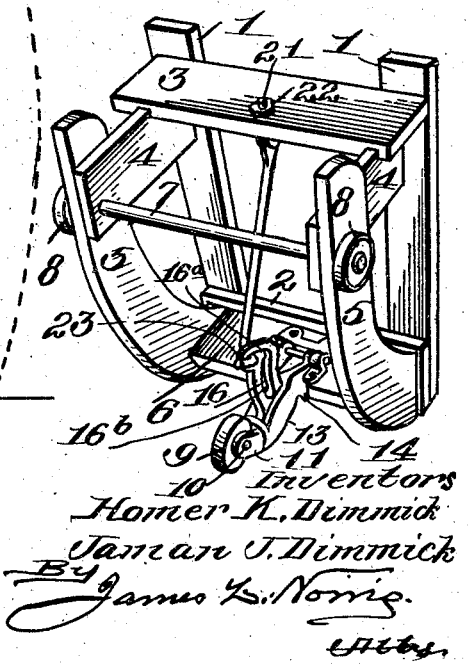

Figure 1 is a sectional side elevation of the combined truck and support. Fig. 2 is a similar view when it is tilted. Fig. 3 is a perspective view looking from the under side, and Fig. 4 is a detail.

Referring to the drawings by reference characters, the frame of the truck consists of two longitudinally-extending beams 1, which are secured at one end upon a front cross-bar 2 and at their other end upon a rear cross-bar 3. The truck-frame further comprises a pair of vertical posts 4, to which is secured the rear cross-bar 3 and the two longitudinally-extending beams 1. Secured rigidly and strongly, respectively, to the lower end of the posts 4 is a pair of fulcrumed beams or rockers 5, which extend gradually forward and upward to the front cross-bar 2, which is rigidly secured on the upper ends of said rockers. Between the upper ends of the rockers and abutting against the lower face of the cross-bar 2, as well as being secured to the rockers and the cross-bar 2, is a cross-bar 6. The function of said bar will be hereinafter referred to.

Extending through the vertical posts 4 and the rockers 5 is a transversely-extending shaft 7, having mounted upon its projecting ends the rear supporting-wheels 8. The front supporting-wheel is designated by the reference character 9, pivoted, as at 10, in a bracket 11, which is swivelly connected, as at 12, to a shiftable member 13. The shiftable member 13 is provided with a nose 14, which when the wheel 9 is in its operative position is adapted to engage against the lower edge of the cross-bar 7, said cross-bar forming an abutment or stop to arrest the movement in one direction of the shiftable member 13. The shiftable member 13 is provided with a rearward extension 15, having a substantially L-shaped slot 16, into which operates a locking member, to be hereinafter referred to, for arresting the movement of the shiftable member 13 in an opposite direction. The shiftable member 13 is pivoted, as at 17, to the retaining member 18, fixedly secured to the inner face of the cross-bar 7. The locking member consists of an elongated rod 19, having its rear end pivotally connected, as at 20, to a short arm 21, extending through the cross-bar 3 and retained in position through the medium of the nut 22, the arm 21 being screw-threaded to receive the nut 22. The forward end of the rod 19 is provided with a substantially L-shaped hook 23, the horizontally-extending portion of said hook 23 being adapted to operate in the slot 16, and the vertically-extending portion of the L-shaped hook 23 is adapted to lie at one side of the extension 15, so as to retain a permanent connection between the locking member and the extension 15.

When the L-shaped hook is in engagement with the portion 16ª of the slot 16, it will prevent the rearward movement in one direction of the shiftable member 13; but when the L-shaped hook 23 is in that portion of the slot 16 designated by the reference character 16ᵇ the shiftable member 13 will be permitted to have a rearward movement. The position and the arrangement of the locking member is such that it can be elevated by the foot of the operator, so that when elevated the hook portion 23 of the locking member will be moved out of the portion 16ª of the slot 16. When the truck is moved to resume its normal position, the shiftable member 13 will be moved forward, also carrying the wheel 9 therewith, which will cause the automatic return of the hook 23 into that portion of the slot 16 indicated by the reference character 16ª, thereby preventing any rearward movement to the member 13 until the locking member is moved, so that the hook 23 will travel in that portion of the slot 16 designated by the reference character 16ᵇ.

It is thought that the many advantages of a wheel truck or support constructed in accordance with the foregoing description, taken in connection with the accompanying drawings, can be thoroughly understood, and it will furthermore be evident that changes, variations, and modifications can be resorted to without departing from the spirit of our invention or sacrificing any of its advantages, and we therefore do not wish to restrict ourselves to the details of construction hereinbefore described and set forth in the annexed drawings, but reserve the right to make such changes, variations, and modifications as come properly within the scope of the protection prayed.

Having thus fully described our invention, what we claim as new, and desire to secure by Letters Patent, is—

1. In a combined truck and support, a frame, a pair of rear wheels therefor, a shiftable member suspended from said frame and provided with a substantially L-shaped slot, a front wheel suitably connected with said shiftable member, and a locking member operating in said slot and adapted to automatically engage said shiftable member for retaining said front wheel in its operative position.

2. A combined truck and support comprising a frame provided with a fulcruming means, a pair of rear wheels for said frame, a front wheel, a shiftable member suspended from said frame and carrying said front wheel, said shiftable member provided with a slot having portions thereof extending in an opposite direction with respect to each other, and a pivoted locking member carried by said frame and adapted to operate in said slot and to automatically engage said shiftable member for retaining said front wheel in position.

3. A combined truck and support comprising a frame having a fulcruming means, a shiftable support for the front end of said frame, said support suspended from said frame and provided with a slotted rearward extension, and a pivoted locking member carried by the frame and engaging in said slotted extension for retaining said support in its operative position.

4. A combined truck and support comprising a frame provided with a fulcruming means, a shiftable member suspended from the forward part of said frame and adapted when in its operative position to support the forward end of the frame, said shiftable member provided with a slotted rearward extension, and a locking member operating in said slot and adapted when engaging in the rear part of said slot to retain said shiftable member in its operative position and when moved to the forward part of said slot, adapted to permit of the shifting of said shiftable member.

5. A combined truck and support comprising a frame having a fulcruming means, a shiftable supporting member suspended from the forward part of said frame, said member provided with a rearward extension having a substantially L-shaped slot, and a locking-rod pivoted at one end to the rear of said frame and its other end provided with an L-shaped hook operating in the slot of said rearward extension.

6. A combined truck and support comprising a frame provided with a fulcruming means, a shiftable supporting member provided with a rearward extension and a nose, said nose adapted to engage the frame to prevent movement of said member in one direction, and a locking-rod pivoted with the frame and engaging in said extension for limiting the movement of said member in an opposite direction.

7. A combined truck and support comprising a frame provided with a fulcruming means, a shiftable supporting member provided with a rearward extension and a nose, said nose adapted to engage the frame to prevent the movement of said member in one direction, a locking-rod pivoted with the frame and engaging in said extension for limiting the movement of said member in an opposite direction, a pair of rear wheels for said frame, and a front wheel swivelly connected to said member.

8. A combined truck and support comprising a frame provided with a fulcruming means, a shiftable supporting member provided with a rearward extension and a nose, said nose adapted to engage the frame to prevent the movement of said member in one direction, and a locking-rod pivotally connected with said frame and engaging said extension for limiting the movement of said member in an opposite direction, said rod manually released from its operative position and automatically movable to its operative position.

9. A combined truck and support comprising a frame provided with a fulcruming means, a shiftable member suspended from the forward portion of said frame, and provided with a rearward extension, a pivoted locking-rod carried by the frame and adapted to automatically engage said extension for locking said member in its operative position, said rod manually removed from its locking position, a front wheel suitably connected to said shiftable member, and a pair of rear wheels suitably connected with said frame.

In testimony whereof we have hereunto set our hands in presence of two subscribing witnesses.

HOMER K. DIMMICK.
JAMAN J. DIMMICK.

Witnesses:
LAURETTA FISHER,
IVAN DIMMICK.